INVENTORS
Frank M. Gibson &
BY Clyde H. Schamel
S. C. Thorpe
ATTORNEY

United States Patent Office 3,084,972
Patented Apr. 9, 1963

3,084,972
AUTOMOTIVE BODY SHROUD AND ROCKER PANEL CONSTRUCTION
Frank M. Gibson, Detroit, and Clyde H. Schamel, Royal Oak, Mich., assignors to General Motors Corporation, Detroit, Mich., a corporation of Delaware
Filed Aug. 21, 1961, Ser. No. 132,872
5 Claims. (Cl. 296—28)

This invention relates to automotive vehicles and particularly to the construction of the shroud and rocker panels thereof so as to reduce the accumulation of rust or other corrosion inducing contaminants on the enclosed internal surfaces of the rocker panels.

In most modern automotive passenger vehicles the lower side margins of the passenger compartment are defined by members termed "rocker panels" which extend longitudinally below the door openings and serve to reinforce the body floor at its connections to the upright pillars which define the sides of the door openings. In the interest of strength, these rocker panels are made hollow, either in the form of an integral one-piece tubular section, or built up of inner and outer stampings joined together to effect the desired tubular-like sill or beam. Because of its location below the door and window openings, and its exposure to the road surface it has long been a problem in the industry to prevent water and other corrosion inducing contaminants from reaching and accumulating on the internal surfaces of these hollow rocker panels. While considerable effort has been expended in attempting to seal all points of entry into these hollow rocker panels, and alternatively to provide them with drain openings, ventilating ports, etc. to meet this problem, results have been considerably less than satisfactory. Complete sealing of the rocker panel external surfaces against entry of water and vapor has proven effective for only a limited portion of the normal vehicle life, and the alternative provisions for water drainage and ventilation heretofore tried have in large degree adversely served as points of entry of road dirt which tends to absorb and retain water therein.

We have conceived what we believe to be a novel means of practically eliminating the aforementioned problem, in a relatively simple and inexpensive manner. Since air for ventilating the interior or passenger compartment of the body is now conventionally introduced through vent openings in the cowl or shroud structure just forwardly of the vehicle windshield, or through air intake means ahead of but connected to the shroud structure, we have arranged for a part of such ventilating air and any rain water entering therewith to be passed longitudinally through the rocker panels. Such sluicing and ventilating of the internal wall surfaces of the rocker panels operates most effectively to cleanse and dry them during normal operation of the vehicle, with the result that such corrosion need no longer be a problem during the reasonably expected life of the vehicle. An outlet adjacent the rear end of the rocker panel serves to allow discharge of the air and water exteriorly of the body at that point.

It is accordingly the object of our invention to provide an improved shroud and rocker panel construction for automotive vehicles whereby a portion of the air for ventilating the interior of the body, and any water entering the body vent intake with such air, is routed via the shroud structure to flow through the rocker panels for the purpose of sluicing and ventilating the internal surfaces of the latter. The invention will be more clearly understood from the following description of one preferred embodiment selected to illustrate the principle involved, having reference to the attached drawings, wherein:

Figure 1:
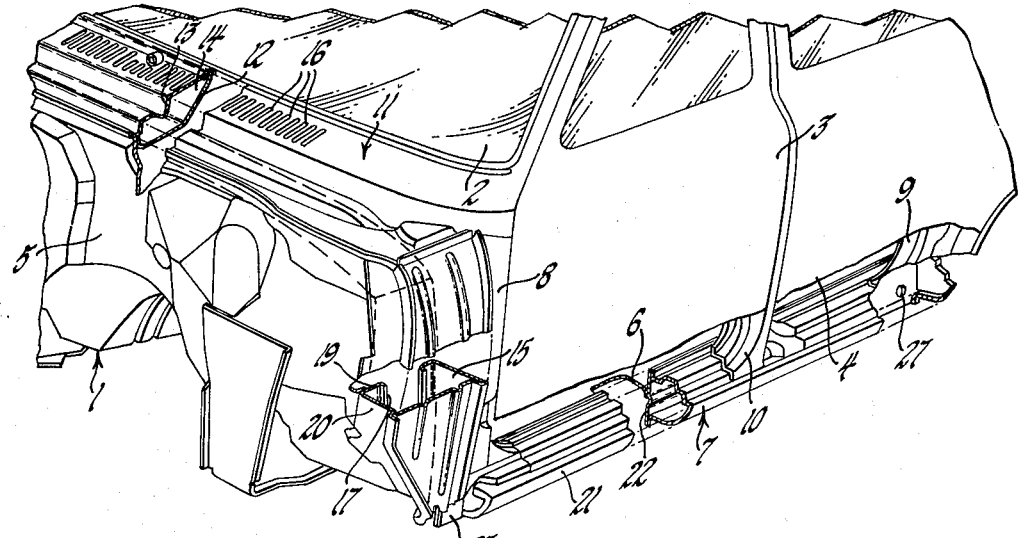
FIGURE 1 is a perspective view of a portion of an automotive vehicle body embodying the invention, with portions broken away and in section.

Referring now in detail to the drawing, an automotive, four-door sedan type passenger body is shown, designated generally by the numeral 1. Included are the usual windshield 2, the front and rear doors 3 and 4 and dash panel 5, defining the front and side walls of the body. Also seen in FIGURE 1 is the body floor panel 6 which extends rearwardly from the dash panel and is reinforced along its side edges (left side only shown) by a hollow rocker panel indicated generally by the numeral 7. To this rocker panel are suitably joined the lower ends of a front pillar 8, a rear pillar 9, and (in the case of this four-door sedan body) an intermediate pillar 10.

As is conventional practice in modern body constructions of this type, the dash panel 5 is located substantially forwardly of the front pillar 8 and the windshield 2, and joining the upper and side extremities of the dash panel to the windshield and front pillar is a cowl or shroud structure designated generally by the numeral 11. It will be noted this shroud structure extends transversely of the body and downwardly thereof at each side just forwardly of the lower half of the front pillar 8. Obviously, however, this downwardly extending portion of the shroud could alternatively constitute the lower half of the pillar 8, although in the specific embodiment illustrated this lower half of the front pillar is referred to separately for purpose of identification. The shroud may be made up of any desired number of stampings or other separate pieces to form, in the main, a shroud inner panel 12 and a shroud outer panel 13 which between them define a plenum chamber. This plenum chamber includes a generally transversely extending portion 14 and a generally vertically extending portion 15 at each end thereof (the left end only being shown). An inlet, shown in the form of spaced grill-like openings 16, is provided in the outer shroud panel 13 for entry of air into the plenum chamber. This particular inlet 16 is shown located centrally of the body, below and just forwardly of the windshield 2, but obviously could be located elsewhere for entry of air into the shroud for ventilation of the interior of the body. Such air for ventilating a body interior is discharged through an outlet shown at 17 in the shroud inner panel defining the vertical portion 15 of the plenum chamber. Suitable means (not shown) may be added at this outlet 17 to insure exclusion of any rain water which enters the inlet 16 with the air from passing into the body interior. Also, provisions (not shown) may be made for heating the air passing into the body at the plenum chamber outlet 17, or for tapping the plenum chamber at other points for delivery of heated air to the interior of the body.

Figure 2:
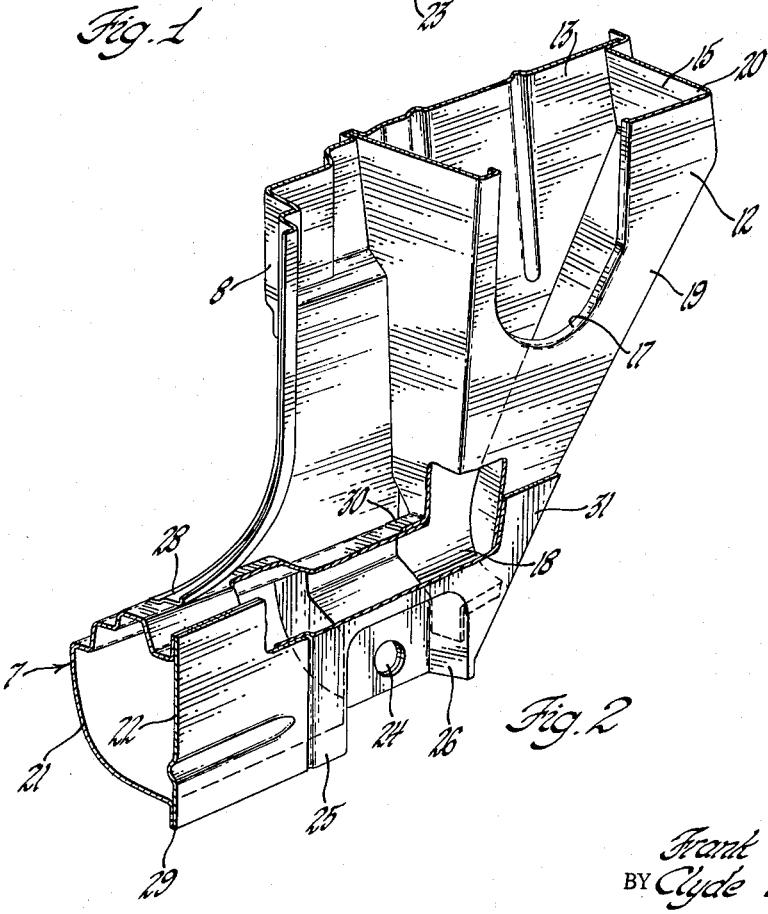
FIGURE 2 is an enlarged fragmentary view in perspective of the left front pillar, side shroud and the adjacent portion of the rocker panel shown in FIGURE 1, with parts broken away and in section, the view being taken as seen from the interior of the body.

As best shown in FIGURE 2 the portion 15 of the plenum chamber extends downwardly opposite the forward end of the rocker panel 7. At its lower end, the shroud outer panel 13 is turned inboard as shown at 18 to meet the inner wall 19 and front wall 20 of the shroud inner panel 12, thereby closing the lower end of this portion of the plenum chamber on three sides. The rocker panel 7 is shown comprising an outer wall 21, and an inner wall 22. Since it is desired for appearance reasons that the vehicle front fender (not shown) will overlie the shroud outer panel 13 and the lower half of the front pillar 8 and be flush with the rocker panel outer wall 21 when the fender is installed, a substantial offset inboard of the body must be provided for this pillar and shroud outer panel just forwardly of the front end of the rocker panel. Accordingly, adjacent its forward end, the lower end outer portion of the rocker panel outer wall 21 is turned transversely inboard, and just forwardly thereof the lower portion of the pillar 8 is similarly offset transversely inboard as shown at 23 (FIGURE 1). Also, since a mounting hole 24 (FIGURE 2) is desired for anchoring a front fender fastening (not shown), the rocker panel inner wall 22 is provided with a forward extension 25 which has an outward embossment or offset 26 reinforcing the pillar offset 23. There is thereby formed a trough-like inlet to the front end of the rocker panel, above the offset portions 23 of the pillar and 26 of the rocker panel inner wall extension, which inlet is in open communication with the lower end of the vertical portion 15 of the plenum chamber. At its rear end, adjacent the rear pillar 9, the rocker panel is provided with an outlet 27 (FIGURE 1) for discharge of air and water exteriorly of the body.

Thus it will be evident that during operation of the vehicle in rainy weather, air and water entering the shroud inlet 16 will be conducted to each side of the vehicle via the connecting plenum chamber portions 14 and 15, with a part of the air being available for discharge through the upper plenum chamber outlet 17 and into the interior of the vehicle for ventilation purposes, and the remainder of the air, together with the water, continuing downwardly to the bottom of the plenum chamber portion 15 for passage into the rocker panel 7. Such water thence flows longitudinally through the rocker panel, sluicing the inner wall surfaces thereof, and discharging exteriorly of the vehicle through the rocker panel outlet 27. As a result, the interior of the rocker panel is periodically washed of any accumulations of road dirt, salt and other contaminants which would otherwise remain therein and promote corrosion, and during dry weather the internal surfaces of the rocker panel are kept dry by the flow of ventilating air therethrough in the same manner.

It will be appreciated that all such connections such as are shown in the drawing at 28 between the front pillar and the rocker panel, at 29 between the rocker panel inner and outer walls, at 30 and 31 between the shroud inner panel and the rocker panel outer wall and inner wall extension, etc. may be welded or otherwise secured in conventional manner; also, that the specific manner described for arranging intercommunication between the front end of the rocker panel and the lower end of the shroud plenum chamber portion 15 may be varied to meet constructional dictates of the vehicle body without departing from the spirit and scope of our invention as hereinafter claimed.

We claim:

1. In an automotive body, a hollow rocker panel extending longitudinally of the body along one lower side thereof, a front pillar and shroud defining a hollow structure extending upwardly from and secured at its lower end to the forward end of the rocker panel, said structure and the forward end of the rocker panel having connecting openings for passage of air and water into the rocker panel, and means for conducting air and water into said structure above said openings from the atmosphere exteriorly of the body, said rocker panel having an outlet remote from said structure for discharge to the atmosphere exteriorly of the body of air and water passing through said rocker panel from said openings.

2. In an automotive body, body side structure including a hollow rocker panel extending longitudinally of the body adjacent the bottom thereof, a hollow shroud structure forwardly of said rocker panel and having an opening for entry of air and water from the atmosphere externally of the body, a first outlet for discharge of air interiorly of the body, and a second outlet below said first outlet for discharge of air and water into the forward end of said rocker panel, said rocker panel having an inlet adjacent its forward end communicating with said second outlet and an outlet adjacent its rearward end for discharge of air and water from the rocker panel to the exterior of the body.

3. In an automotive body having a side door, a hollow rocker panel extending longitudinally of the body below said door and a shroud extending transversely of the body and forwardly of said door, said rocker panel having an inlet adjacent its forward end and an outlet adjacent its rearward end, said shroud including spaced walls defining a plenum chamber for conducting ventilating air to the interior of the body and air and water for ventilating and sluicing the interior of said rocker panel, said plenum chamber having a generally vertically extending portion terminating at its lower end in communication with said rocker panel inlet, said plenum chamber having an inlet above said portion lower end for entry of air and water from the exterior of the body and an outlet above said portion lower end for delivery of ventilating air to the interior of the body.

4. In an automotive body, a front pillar, a rear pillar and a hollow rocker panel interconnecting the lower ends of pillars, said rocker panel having an inlet for entry of air and water thereinto at its front end and an outlet for discharge of air and water therefrom to the exterior of the body adjacent said rear pillar, a windshield extending transversely of the body from said front pillar, a dash panel extending transversely of the body below the windshield and spaced forwardly of said front pillar, a hollow shroud including a transversely extending portion interconnecting the upper extremities of the dash panel and the lower extremities of the windshield, and a generally vertical portion interconnecting the end of said dash panel and the front pillar, said shroud transversely extending portion having an inlet for entry of air and water from the exterior of the body, said shroud vertical portion having a first outlet for discharge of air interiorly of the body and a second outlet below said first outlet, said second outlet being connected to said rocker panel inlet.

5. In an automotive body, a front wall comprising a windshield, a front pillar adjacent one side of the windshield, a dash panel disposed below and forwardly of the windshield and a shroud extending transversely of the body between the windshield and dash panel and extending vertically of the body between the dash panel and the pillar, said shroud having spaced apart walls defining a plenum chamber, one of said walls having an inlet for entry of air and water from the atmosphere exteriorly of the body, another of said walls having an outlet for discharge of air interiorly of the body, said plenum chamber terminating vertically at one side of the body below said outlet and adjacent the lower end of said pillar, and a hollow rocker panel extending longitudinally of the body along said side from the vertical terminus of the plenum chamber, said pillar having its lower end terminating in offset relation inboard of the adjacent extremities of the rocker panel rearwardly of said pillar, said rocker panel having its lower inboard and outward extremities offset to reinforce the said offset lower end of the pillar and defining a trough extending over said offset lower end of the pillar, said plenum chamber having a second outlet opposite and open to said trough for flow of air and water into the rocker panel from the plenum chamber, said rocker panel having an outlet adjacent its rear end for discharge of air and water to the exterior of the body.

References Cited in the file of this patent

UNITED STATES PATENTS

| | | |
|---|---|---|
| 2,112,101 | Kliesrath | Mar. 22, 1938 |
| 2,388,419 | Komenda | Nov. 6, 1945 |
| 2,696,774 | Bayley | Dec. 14, 1954 |